US006389353B2

(12) United States Patent
Kondo

(10) Patent No.: US 6,389,353 B2
(45) Date of Patent: May 14, 2002

(54) ELECTRONIC CONTROL APPARATUS AND METHOD FOR ENGINES

(75) Inventor: Hiroshi Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 09/725,512

(22) Filed: Nov. 30, 2000

(30) Foreign Application Priority Data

Nov. 30, 1999 (JP) .......................................... 11-339992

(51) Int. Cl.[7] ............................ G06G 7/70; G06F 19/00
(52) U.S. Cl. ........................................ 701/114; 701/115
(58) Field of Search ................................ 701/101, 102, 701/103, 114, 115; 711/158, 163; 712/205, 206, 233, 241; 717/127, 131, 162

(56) References Cited

U.S. PATENT DOCUMENTS 5,875,337 A * 2/1999 Miyano ...................... 717/127
6,148,439 A * 11/2000 Nishiyama .................. 712/241

* cited by examiner

*Primary Examiner*—Willis R. Wolfe
(74) *Attorney, Agent, or Firm*—Nixon & Vanderhye P.C.

(57) ABSTRACT

An electronic control apparatus for engines has a memory and a processing unit. The processing unit executes various processing routines while accessing the memory in a predetermined access speed or wait-time. The routines include a rotation interrupt routine which is initiated in synchronized relation with a rotation of an engine. The memory access speed of the processing unit is set initially to a low speed, when an ignition switch is turned on to start a power supply to the processing unit. However, it is changed to a high access speed, when a rotation speed of the engine increases and a rate of execution of the interrupt routine by the processing unit increases.

20 Claims, 5 Drawing Sheets

ELECTRONIC CONTROL APPARATUS AND METHOD FOR ENGINES

CROSS REFERENCE TO RELATED APPLICATION

This application is based on and incorporates herein by reference Japanese Patent Application No. 11-339992 filed Nov. 30, 1999.

BACKGROUND OF THE INVENTION

This application relates to an electronic control apparatus and method for controlling internal combustion engines, which reduces a CPU operation time rate when an internal combustion engine rotates at high rotation speeds.

Conventional electronic control apparatuses for internal combustion engines control fuel injection and ignition timing by executing various programmed control processing by respective central processing units (CPUS). Each CPU executes calculations of fuel injection amount and ignition timing as well as other associated processing in timed or synchronized relation with rotation of the engine, because the fuel injection and the ignition timing should be controlled in timed relation with the crankshaft rotation position of the engine. The CPU executes these calculations and associated processing as its rotation interrupt routines with high priority while interrupting other low priority routines such as a base routine and time interrupt routines. The CPU operates to execute the rotation interrupt routines more often per unit time as the engine rotation speed increases, resulting in an increase of the CPU operation time rate which is defined as the percentage of time the CPU operates (executes the rotation interrupt routines) per unit time.

The CPU usually needs some wait-time to access memories such as ROMs and RAMs in retrieving stored programs or data therefrom in the routines. The CPU operation time rate can be reduced by using high speed memories which are of the short access time-type and setting short wait-time. However, if the CPU access low speed memories while setting the short wait-time, the CPU starts retrieving the programs or data before data has completely been output from the memory. The CPU thus fails to retrieve data and calculate control data using the retrieved data.

Further, the access time of a memory increases as a power supply voltage such as a battery voltage falls. The battery voltage excessively falls when the engine is cranked by a starter motor, thus disabling the CPU to retrieve data from the memories with the set wait-time. This problem also occurs when an ignition switch is turned off, because the voltage supplied to the CPU falls gradually. In this instance, the CPU is disabled to access programs stored in the memory correctly, as the result, the CPU may write the wrong data in a battery back-up RAM.

SUMMARY OF THE INVENTION

It is therefore an object of the present invention to provide an electronic control apparatus and method which is capable of reducing an operation time rate of a central processing unit.

It is a further object of the present invention to provide an electronic control apparatus and method which is capable of enabling a central processing unit to operate properly when an access time of a memory is lengthened.

According to the present invention, an electronic control apparatus for engines has a memory and a processing unit. The processing unit executes various processing routines while accessing the memory in a predetermined access speed or wait-time. The routines include a rotation interrupt routine which is initiated in synchronized relation with a rotation of an engine. The memory access speed of the processing unit is set initially to a low speed when an ignition switch is turned on to start a power supply to the processing unit, so that the processing routines are executed by the processing unit in the low access speed. When a rotation speed of the engine rises and a rate of execution of the interrupt routine by the processing unit increases, the memory access speed is changed to a high access speed. When the ignition switch is turned off to stop the power supply to the processing unit, the memory access speed is returned to the low access speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
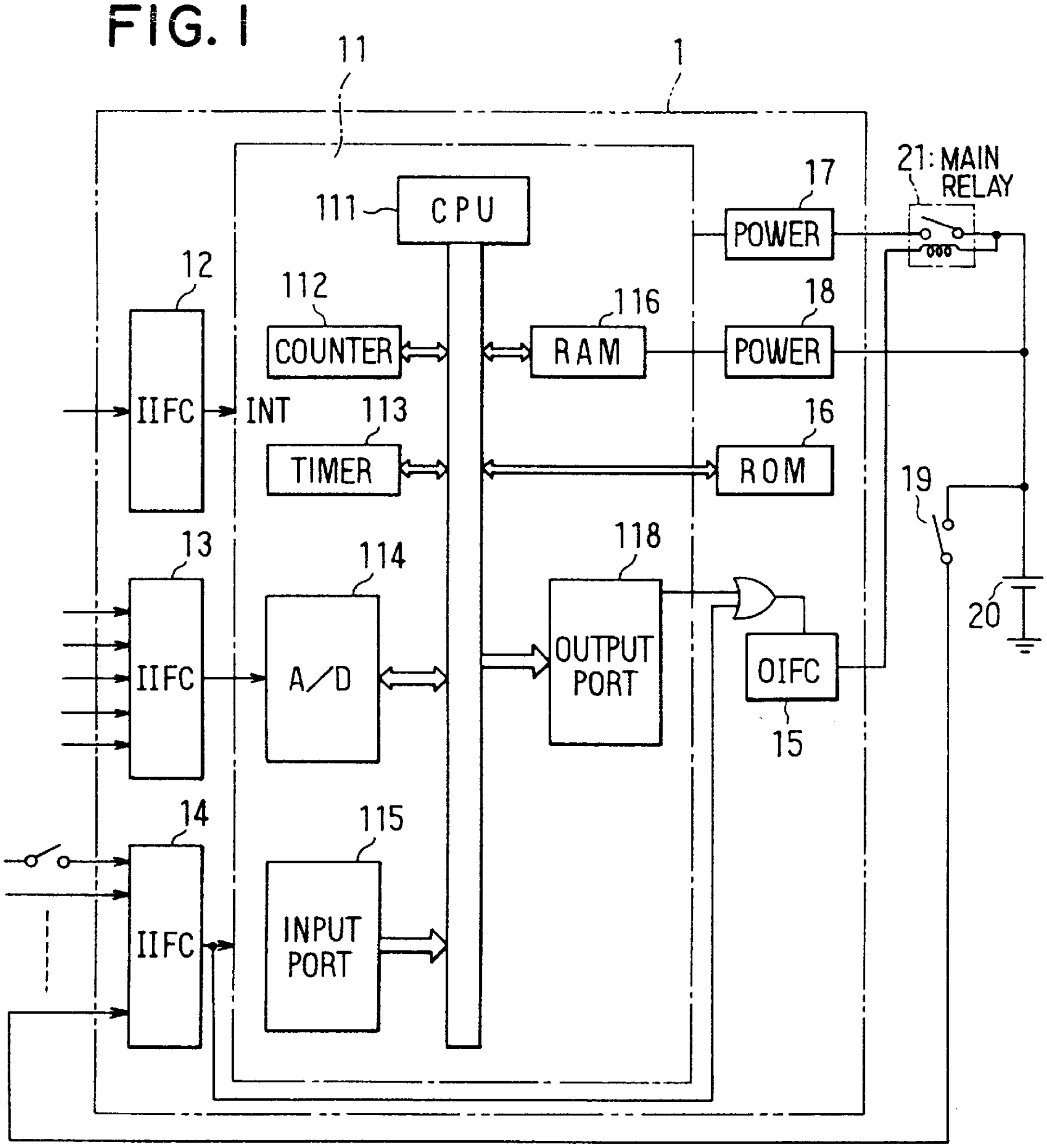
FIG. 1 is a block diagram showing an electronic control apparatus according to an embodiment of the present invention.

Referring first to FIG. 1, an electronic control apparatus 1 for an engine (not shown) is constructed with a microcomputer 11, input interface circuits (IIFCS) 12–14, an output interface circuit (OIFC) 15, a read-only memory (ROM) 16 storing control programs and data, and power supply circuits 17 and 18. The microcomputer 11 is provided with a central processing unit 111 which executes various processing based on control programs stored in the ROM 16, a timer counter 112, a timer 113 which measures rotation speeds of the engine, an A/D converter 114, an input port 115, a random access memory (RAM) 116 which operates as a working memory and the like, and an output port 118.

The power supply circuit 17 is connected to a storage battery 20 through an ignition switch 19 to supply electric power to the microcomputer 11 when the ignition switch 19 is turned on or the main relay is turned on, that is, only when the engine is in operation. The power supply circuit 18 is directly connected to the battery 20 to supply the electric power to a part of the RAM 116 irrespective of the operation of the engine, so that some data calculated by the CPU 111 may be stored in battery back-up RAM regions even after the engine operation is stopped.

The input interface circuit 12 receives a rotation signal of a rotation sensor (not shown) at every predetermined angular rotation of the engine. This rotation signal is used to measure the rotation speed NE of the engine and to initiate a rotation interrupt routine by the CPU 111. The input interface circuit 13 receives various sensor signals indicative of engine operating conditions such as air pressure PM, throttle angle TA and coolant temperature THW. These sensor signals are input in analog forms and converted into digital signals by the A/D converter. The input interface circuit 14 receives various digital signals such as ignition switch. The output interface circuit 15 receives values of fuel injection amount, ignition timing and main relay operation calculated by the CPU 111 through the output port 118, and produces pulse signals to control the fuel injection and the ignition timing.

Figure 2:
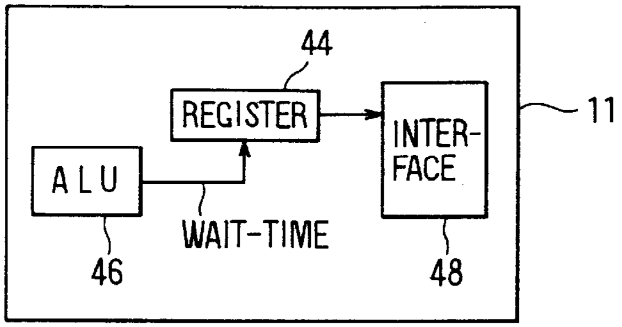
FIG. 2 is a block diagram showing a part of a microcomputer used in the embodiment shown in FIG. 1.

As shown in FIG. 2, the microcomputer 11 further has, in addition to the above construction, a register 44 to set therein a wait-time indicative of a delay of the CPU 111 required in accessing memories. This delay is provided, that is, the wait-time is set, by executing an instruction of setting a value in the register 44 written in a program by an arithmetic logic unit (ALU) 46. This program is retrieved in the wait-time represented by the value which is automatically set in the register 44 at the time of activating the CPU operation. The access to the memories such as the ROM 16 and the RAM 116 is executed through an external access interface circuit 48.

Figure 3A:
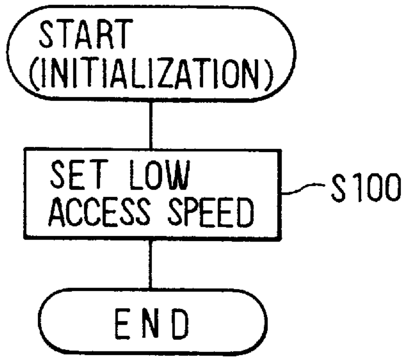
FIGS. 3A to 3E are flow charts showing an initialization routine, a base routine, a rotation interrupt routine, a timer interrupt routine A and a timer interrupt routine B, which are executed by a CPU in the embodiment, respectively.
Figure 3B:
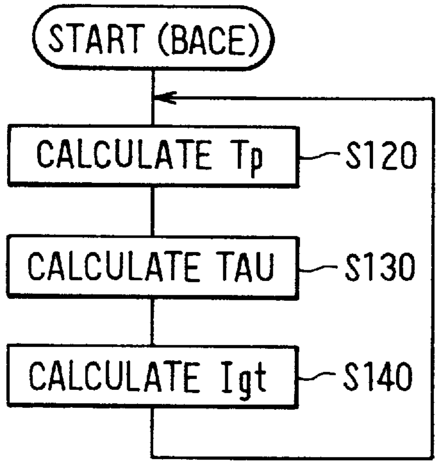
Figure 3C:
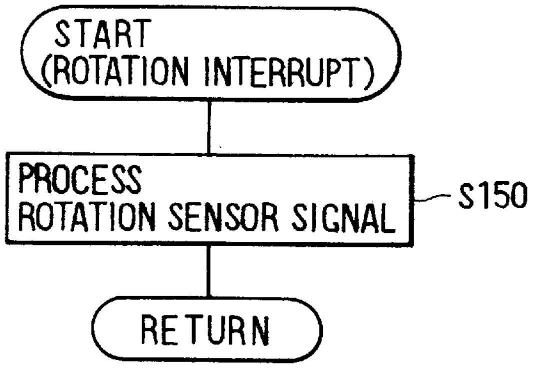

The microcomputer 11, particularly the CPU 111, is programmed to execute various processing or routines as shown in FIGS. 3A to 3C.

When the electric power supply to the microcomputer 11 is started, that is, the microcomputer 11 is activated, the CPU 11 first executes an initialization routine shown in FIG. 3A. Specifically, the CPU 111 sets at step S100 a value of the register 44 to a relatively low access speed (long wait-time) so that the memories are accessed at a low speed. The CPU 111 also executes, although not shown in the figure, other processing such as an initialization of various component parts of the microcomputer 11 and an initialization of the RAM 16 in this initialization.

The CPU 111 then executes a base routine to calculate a fuel injection amount and ignition timing. For instance, as shown in FIG. 3B, the CPU 111 calculates a basic fuel injection amount Tp at step S120 based on the intake air pressure PM and the engine rotation speed NE, and calculates a final injection amount TAU at step S130 by correcting the calculated basic amount Tp by the coolant temperature THW and the throttle angle TA. The CPU 111 further calculates an ignition timing Igt at step S140 based on the intake air pressure PM and the rotation speed NE. The CPU 111 repeats the steps 120 to S140 as long as no interrupt routine is requested.

The base routine may be interrupted by a rotation interrupt routine as shown in FIG. 3C. This routine is executed with the highest priority and initiated in synchronism with the rotation signal applied from the rotation sensor to the input interface circuit 12. In this routine, the CPU 111 calculates the rotation speed NE and executes other rotation signal-related processing for controlling the fuel injection and the ignition timing at step S150. The CPU 111 returns its processing to the routine which has been interrupted, for instance, to the base routine (FIG. 3B), after this rotation interrupt routine.

Figure 3D:
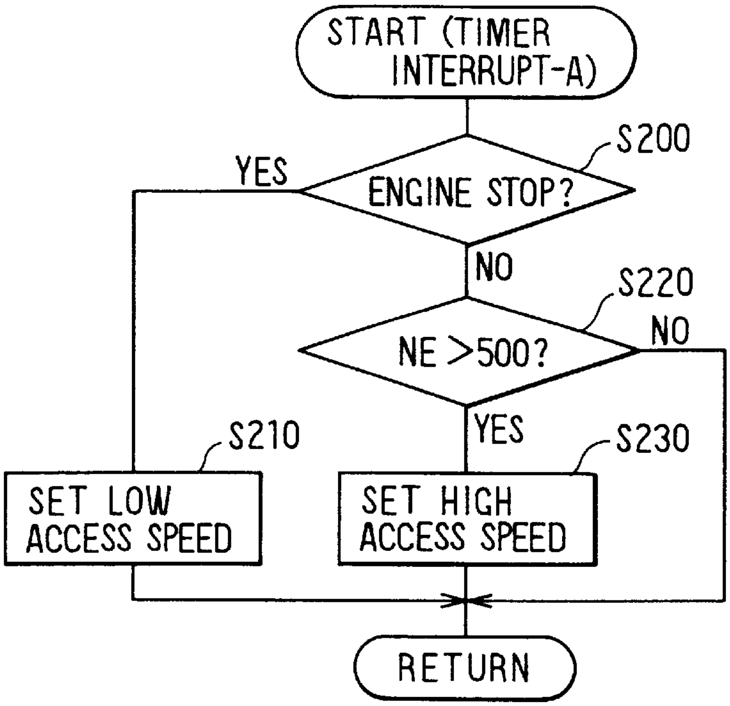
Figure 3E:
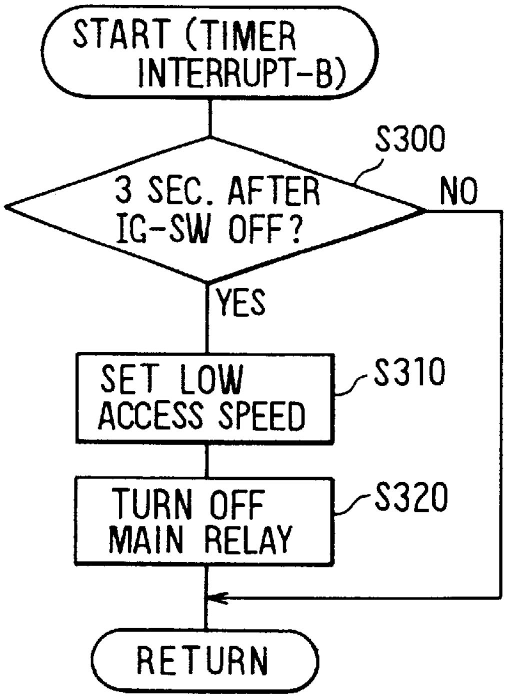

The base routine is also interrupted by timer interrupt routines A and B (interrupt-A and interrupt-B) shown in FIGS. 3D and 3E. The timer interrupt routines A and B have respective priorities higher than that of the base routine (FIG. 3B) but lower than that of the rotation interrupt routine (FIG. 3C).

Figure 5:
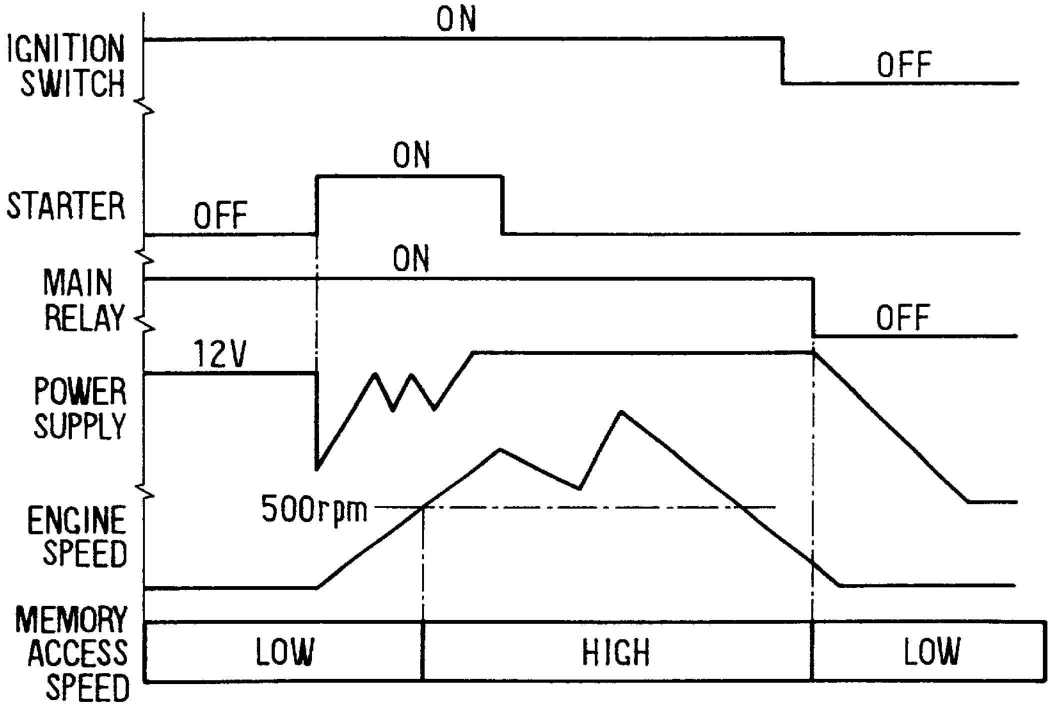
FIG. 5 is a time chart showing an operation of the embodiment.

The interrupt routine A shown in FIG. 3D is initiated in every fixed time interval. In this routine, the CPU 111 checks at step S200 whether the engine is stopped, that is, at rest. This checking is made with reference to turned-on or turned-off condition of the ignition switch 19, for instance. If the engine is at rest, the CPU 111 sets the value of the register 44 to the low access speed at step S210. If the engine is in operation, the CPU 111 further checks at step S220 whether the engine speed NE is higher than a reference speed corresponding to an engine idling speed, for instance, 500 rpm. As long as the engine speed NE is lower than the reference speed, the CPU 111 maintains the low access speed set in the initialization routine (FIG. 3A). However, the CPU 111 sets the value of the register 44 to a high access speed (short wait-time) at step S230, as long as the engine speed NE is above the reference speed. Thus, as shown in FIG. 5, the CPU 111 is enabled to access memories and retrieve data at low access speed, even when the power supply voltage from the main relay circuit 117 falls due to the starter motor operation for starting engine operation.

Figure 4:
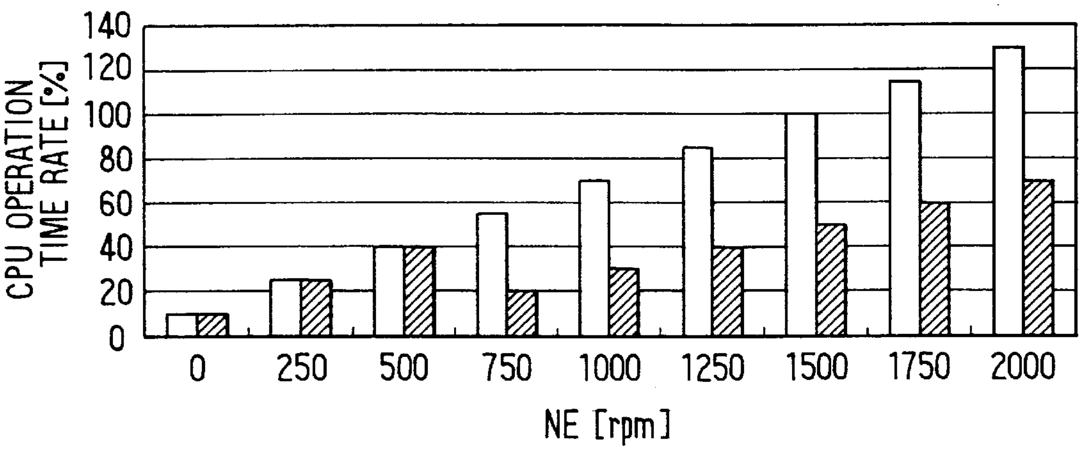
FIG. 4 is a graph showing a CPU operation time rate in relation to engine speeds in the embodiment.

As shown in FIG. 4, the CPU operation time rate defined as the rate of operation time (time of executing the rotation interrupt routine) of the CPU 111 in unit time increases as the rotation speed NE increases. If the timer interrupt routine A is not executed, that is, if the access speed is not changed at all, the CPU operation time rate increases in proportion to the rotation speed as shown in white bars. With the execution of the timer interrupt routine A, however, the CPU operation time rate is reduced above the reference speed (500 rpm) as shown in black bars. Thus, the CPU 111 is enabled to retrieve data from the memories and operate properly without fail even at high engine rotation speeds.

It is to be noted that the wait-time which has once been shortened at step S230 is not lengthened even if the engine speed NE falls below the reference speed, unless the engine operation is stopped. In an internal combustion engine having multiple cylinders, a cylinder discrimination is usually made to determine the fuel injection timing from cylinder to cylinder. If this cylinder discrimination fails, the calculations in the base routine is executed on an assumption that the engine speed NE is null (0 rpm), for instance, although the engine is actually operating at above the reference speed. In this instance, if the wait-time is lengthened in response to this assumption, the CPU operation time rate will rise unnecessarily. Therefore, it is preferred not to change the wait-time once it has been set to the short time.

Figure 6:
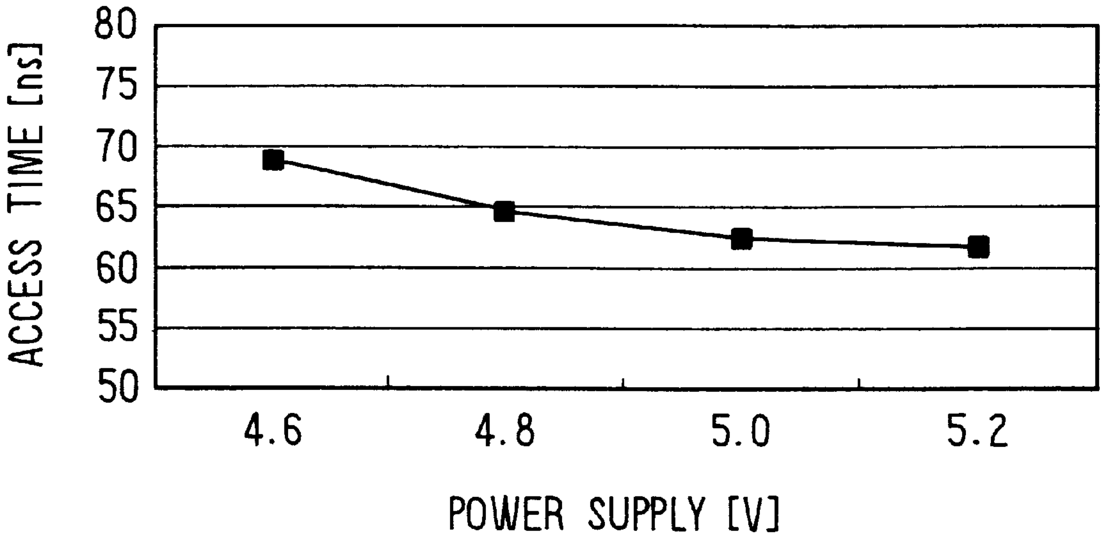
FIG. 6 is a graph showing a memory access time of the CPU in relation to power supply voltages in the embodiment.

The interrupt routine B shown in FIG. 3E is initiated in every another fixed time interval. In this routine, the CPU 111 checks at step S300 whether more than a predetermined time, for instance 3 seconds, has elapsed after the ignition switch (IG-SW) 19 was turned off, that is, after the engine was stopped. If the predetermined time has not elapsed yet, the CPU 111 ends this routine. The CPU 111 sets a value of the long wait-time of the register 44 at step S310 for the low access speed, if more than the predetermined time has elapsed. The CPU 111 then turns off the main relay circuit 117 at step S320. The power supply voltage to the microcomputer 11 starts to decrease as shown in FIG. 5, and the CPU 111 requires longer access time (wait-time) as the power supply voltage decreases as shown in FIG. 6. With the lengthened wait-time, the CPU 111 is still enabled to continue to access the memory, particularly to the battery back-up RAM 116, to store data to be maintained therein without fail.

According to the above embodiment, the CPU 111 is enabled to retrieve data from the memories at the low access speed even when the battery voltage falls due to the starter motor operation as shown in the left side of FIG. 5. As the memory access speed is switched to the high access speed once the engine rotation speed NE has reached the reference speed (500 rpm) as shown in the middle part of FIG. 5, the CPU operation time rate can be reduced. Here, the reference speed is used to estimate high possibility of the increase of the engine speed NE. Further, the CPU 111 is enabled to maintain its operation for a certain period to complete its required operation after the ignition switch 19 is turned off, because the memory access speed is set to the low speed as shown in the right side of FIG. 5.

The present invention should not be limited to the disclosed embodiment, but may be implemented in many other ways. For instance, the rise of the CPU operation time rate may be determined by calculating an actual CPU operation time rate in place of estimating the possibility of rise based on the engine speed. The memory access speed may be determined based on the surrounding temperature, because the CPU requires more time as the temperature rises. It is possible to set the low access speed to different speeds in the initialization routine and the timer interrupt routines A and B. The access speed may most preferably set to the lowest speed in the initialization routine in consideration of the large fall of the battery voltage in the case of engine starting by the starter motor. Further, the reference speed (500 rpm) may be changed to a plurality of speeds and the memory access speed may be varied to a plurality of access speeds in accordance with the plurality of reference speeds so that the access speed is set to be shorter as the engine speed rises.

What is claimed is:

1. An electronic control apparatus comprising:

memory means for storing at least one of a computer program and data;

processing means for executing the computer program;

check means for checking whether a rise of rate of use of the processing means is estimated; and wait-time control means for reducing a wait-time in which the processing means accesses to and retrieves data from the memory means, when the rise of rate is estimated.

2. The electronic control apparatus as in claim 1, wherein:

the processing means executes the computer program in timed relation with a rotation of an engine; and the check means checks for the rise of rate based on whether an engine rotation speed is above a reference speed.

3. The electronic control apparatus as in claim 2, wherein:

the wait-time control means maintains a reduced wait-time even when the engine rotation speed falls below the reference speed, once the wait-time is reduced in response to a rise of the engine rotation speed to the reference speed.

4. The electronic control apparatus as in claim 2, wherein:

the reference speed is set to about an idling speed of the engine.

5. The electronic control apparatus as in claim 1, wherein:

the check means checks for the rise of rate by calculating a rate of use of the processing means.

6. The electronic control apparatus as in claim 1, further comprising:

access time estimating means for estimating an access time in which the memory means produces the data after being accessed by the processing means, wherein the wait-time control means increases the wait-time as the estimated access time increases.

7. The electronic control apparatus as in claim 6, wherein:

the access time estimating means estimates an increase of the access time in response to a turn-off of an ignition switch for the engine.

8. The electronic control apparatus as in claim 6, wherein:

the access time estimating means estimates an increase of the access time in response to a rise of a surrounding temperature of the memory means above a reference temperature.

9. The electronic control apparatus as in claim 1, wherein:

the wait-time control means sets the wait-time to a largest value initially irrespective of a check result of the check means, each time a power supply to the processing means is started.

10. A control method for an electronic control apparatus having a memory and a processing unit, the method comprising steps of:

executing a computer program stored in the memory by a processing unit;

checking whether a rise of rate of use of the processing means is estimated; and reducing a wait-time in which the processing unit accesses to and retrieves data from the memory, when the rise of rate is estimated.

11. The control method as in claim 10, wherein:

the executing step executes the computer program in timed relation with a rotation of an engine; and the checking step checks for the rise of rate based on whether an engine rotation speed is above a reference speed.

12. The control method as in claim 11, wherein:

the reducing step maintains a reduced wait-time even when the engine rotation speed falls below the reference speed, once the wait-time is reduced in response to a rise of the engine rotation speed to the reference speed.

13. The control method as in claim 11, wherein:

the reference speed is set to about an idling speed of the engine.

14. The control method as in claim 10, wherein:

the checking step checks for the rise of rate by calculating a rate of use of the processing unit.

15. The control method as in claim 10, further comprising steps of:

estimating an access time in which the memory produces data after being accessed by the processing unit; and increasing the wait-time as the estimated access time increases.

16. The control method as in claim 15, wherein:

the estimating step estimates an increase of the access time in response to a turn-off of an ignition switch for the engine.

17. The control method as in claim 15, wherein:

the estimating step estimates an increase of the access time in response to a rise of a surrounding temperature of the memory means above a reference temperature.

18. The control method as in claim 10, further comprising a step of:

setting the wait-time to a largest value initially irrespective of a check result of the checking step, each time a power supply to the processing unit is started.

19. A control method for an electronic control apparatus having a memory and a processing unit, the method comprising steps of:

setting initially a memory access speed of the processing unit to a first value when an ignition switch is turned on to start a power supply to the processing unit;

executing a plurality of processing routines stored in the memory by a processing unit by accessing the memory in the memory access speed, at least one of the routines being executed as an interrupt routine more often per unit time as a rotation speed of an engine increases;

checking whether a rate of execution of the interrupt routine by the processing unit is in an increase;

increasing the memory access speed to a second value higher than the first value as the rate of execution increases; and reducing the memory access speed to a third value lower than the second value when the ignition switch is turned off to stop the power supply to the processing unit.

20. The control method as in claim 19, further comprising a step of:

changing further the memory access speed based on a temperature of the memory.

* * * * *